United States Patent
Sayed et al.

(10) Patent No.: US 11,505,737 B2
(45) Date of Patent: Nov. 22, 2022

(54) COMPOSITIONS AND METHODS FOR CONTROLLING STRONG ACID SYSTEMS

(71) Applicant: Saudi Arabian Oil Company, Dhahran (SA)

(72) Inventors: Mohammed Sayed, Houston, TX (US); Amy J. Cairns, Houston, TX (US); Bashayer S. Aldakkan, Dhahran (SA); Ahmed M. Gomaa, Khobar (SA); Khalid R. Al-Noaimi, Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/015,406

(22) Filed: Jun. 22, 2018

(65) Prior Publication Data
US 2019/0010385 A1    Jan. 10, 2019

Related U.S. Application Data

(60) Provisional application No. 62/524,385, filed on Jun. 23, 2017.

(51) Int. Cl.
| | |
|---|---|
| *C09K 8/72* | (2006.01) |
| *C09K 8/74* | (2006.01) |
| *E21B 43/25* | (2006.01) |
| *C09K 8/52* | (2006.01) |
| *C09K 8/528* | (2006.01) |
| *E21B 37/06* | (2006.01) |
| *E21B 37/08* | (2006.01) |
| *C09K 8/54* | (2006.01) |

(52) U.S. Cl.
CPC .............. *C09K 8/72* (2013.01); *C09K 8/52* (2013.01); *C09K 8/528* (2013.01); *C09K 8/74* (2013.01); *E21B 37/06* (2013.01); *E21B 37/08* (2013.01); *E21B 43/25* (2013.01); *C09K 8/54* (2013.01); *C09K 2208/20* (2013.01)

(58) Field of Classification Search
None
See application file for complete search history.

(56) References Cited

U.S. PATENT DOCUMENTS

| | | |
|---|---|---|
| 3,828,854 A | 8/1974 | Templeton et al. |
| 3,868,998 A | 3/1975 | Lybarger et al. |
| 3,948,324 A | 4/1976 | Lybarger |

(Continued)

FOREIGN PATENT DOCUMENTS

| | | |
|---|---|---|
| CN | 1666007 A | 9/2005 |
| CN | 102399550 A | 4/2012 |

(Continued)

OTHER PUBLICATIONS

Kankaria, S. et al., Matrix Acidizing of Carbonate Rocks Using New Mixtures of HCl/Methanesulfonic Acid. Prepared to be Presented at the SPE International Conference on Oilfield Chemistry held in Montgomery, Texas, USA, SPE-184528-MS (Apr. 3-5, 2017).

(Continued)

*Primary Examiner* — Anuradha Ahuja
(74) *Attorney, Agent, or Firm* — Osha Bergman Watanabe & Burton LLP

(57) ABSTRACT

Provided herein are compositions and methods for the controlled delivery of acid to a subterranean formation.

13 Claims, 7 Drawing Sheets

(56) References Cited

U.S. PATENT DOCUMENTS

| | | | |
|---|---|---|---|
| 4,232,741 A | 11/1980 | Richardson et al. | |
| 4,324,669 A | 4/1982 | Norman et al. | |
| 4,368,136 A | 1/1983 | Murphey | |
| 4,502,540 A | 3/1985 | Byham | |
| 4,737,296 A | 4/1988 | Watkins | |
| 5,964,295 A | 10/1999 | Brown et al. | |
| 6,207,620 B1 | 3/2001 | Gonzalez et al. | |
| 6,431,279 B1 | 8/2002 | Zaid et al. | |
| 7,166,560 B2 | 1/2007 | Still et al. | |
| 7,753,123 B2 | 7/2010 | Fuller | |
| 7,947,629 B2 | 5/2011 | Fuller | |
| 9,512,350 B2 | 12/2016 | Vo | |
| 9,725,643 B2 | 8/2017 | De Wolf et al. | |
| 10,895,140 B2 | 1/2021 | Cairns et al. | |
| 11,156,070 B2 | 10/2021 | Sayed et al. | |
| 2004/0009880 A1* | 1/2004 | Fu | C09K 8/74 507/200 |
| 2008/0017382 A1* | 1/2008 | Harris | C09K 8/04 166/307 |
| 2008/0139412 A1* | 6/2008 | Fuller | C09K 8/52 507/219 |
| 2009/0025933 A1* | 1/2009 | Garcia-Lopez de Victoria | C09K 8/528 166/279 |
| 2009/0042750 A1* | 2/2009 | Pauls | C09K 8/74 507/213 |
| 2009/0131285 A1 | 5/2009 | Wang et al. | |
| 2009/0286701 A1* | 11/2009 | Davidson | C09K 8/52 507/235 |
| 2014/0296113 A1* | 10/2014 | Reyes | C09K 8/528 507/241 |
| 2015/0075797 A1* | 3/2015 | Jiang | E21B 43/283 166/307 |
| 2015/0080271 A1* | 3/2015 | De Wolf | C09K 8/94 507/202 |
| 2016/0244659 A1 | 8/2016 | Shahin et al. | |
| 2016/0298024 A1 | 10/2016 | Panga et al. | |
| 2017/0081584 A1 | 3/2017 | Shahin et al. | |
| 2018/0291720 A1 | 10/2018 | Cairns et al. | |
| 2020/0116001 A1 | 4/2020 | Sayed et al. | |

FOREIGN PATENT DOCUMENTS

| | | |
|---|---|---|
| CN | 102899012 A | 1/2013 |
| CN | 104245878 A | 12/2014 |
| CN | 105950129 A | 9/2016 |
| EP | 0 181 210 A2 | 5/1986 |
| WO | WO-94/25731 A1 | 11/1994 |
| WO | WO-2004/007905 A1 | 1/2004 |
| WO | WO-2013/189842 A1 | 12/2013 |
| WO | WO-2014/099667 A1 | 6/2014 |
| WO | WO-2015/030801 A1 | 3/2015 |
| WO | WO-2015/038153 A1 | 3/2015 |
| WO | WO-2015/154977 A1 | 10/2015 |
| WO | WO-2015/187178 A1 | 12/2015 |
| WO | WO-2016/018374 A1 | 2/2016 |
| WO | WO-2016/043703 A1 | 3/2016 |
| WO | WO-2016/180664 A1 | 11/2016 |
| WO | WO-2018/187565 A1 | 10/2018 |
| WO | WO-2018/237237 A1 | 12/2018 |
| WO | WO-2020/076993 A1 | 4/2020 |

OTHER PUBLICATIONS

Le Page, J.N. et al., An Environmentally Friendly Stimulation Fluid for High Temperature Applications. Presented at the SPE International Symposium on Oilfield Chemistry held in The Woodlands, Texas, USA, SPE-121709-MS (Apr. 20-22, 2009).

Mahmoud, M.A. et al., Stimulation of Carbonate Reservoirs Using GLDA (Chelating Agent) Solutions. Presented at the SPE Trinidad and Tobago Energy/Resources Conference held in Port of Spain, Trinidad, SPE-132286-MS (Jun. 27-30, 2010).

Rabie, A.I. et al., Reaction of GLDA with Calcite: Reaction Kinetics and Transport Study. Presented at the SPE International Symposium on Oilfield Chemistry held in The Woodlands, Texas, USA, SPE-139816-MS (Apr. 11-13, 2011).

Reyath, S.N. et al., Determination of the Diffusion Coefficient of Methanesulfonic Acid Solutions with Calcite Using the Rotating Disk Apparatus. Presented at the SPE International Symposium on the Oilfield Chemistry held in The Woodlands, Texas, USA, SPE-173794-MS (Apr. 13-15, 2015).

Sayed, M and Cairns, A.J., A Low-Viscosity Retarded Acid System for Stimulation of High-Temperature Deep Wells, Offshore Technology Confrence, Houston, Texas, USA, OTC-28838-MA, 20 pages (Apr. 30-May 3, 2018).

International Search Report for PCT/US2018/026247, 4 pages (dated Jun. 19, 2018).

International Search Report for PCT/US2018/038937, 4 pages (dated Oct. 8, 2018).

Written Opinion for PCT/US2018/026247, 7 pages (dated Jun. 19, 2018).

Written Opinion for PCT/US2018/038937, 7 pages (dated Oct. 8, 2018).

Hull, K. L. et al., Bromate Oxidation of Ammonium Salts: In Situ Acid Formation for Reservoir Stimulation, Inorg. Chem., 58:3007-3014 (2019).

Mendelowski, T.; Gazda, A., New Method for acid treatment of deep deposits, Nafta (Katowice, Poland), 31(12): p. 36 (1975). English Machine Translation. No known English language copy.

International Search Report for PCT/US2019/055456, 5 pages (dated Dec. 16, 2019).

Written Opinion for PCT/US2019/055456, 9 pages (dated Dec. 16, 2019).

Office Action with Search Report issued in corresponding Chinese Application No. 201880041173.4, dated Oct. 25, 2021 (18 pages).

Second Office Action issued in corresponding Chinese Application No. 201880041173.4, dated Jun. 6, 2022 (18 pages).

\* cited by examiner

COMPOSITIONS AND METHODS FOR CONTROLLING STRONG ACID SYSTEMS

CROSS-REFERENCE TO RELATED APPLICATIONS

This application claims priority to U.S. Provisional Application No. 62/524,385, filed Jun. 23, 2017, the entirety of which is incorporated herein by reference.

TECHNICAL FIELD

This application relates to compositions and methods for controlling an acidizing treatment, for instance to a subterranean formation.

BACKGROUND

It has been estimated that a significant portion of the world's oil and gas reserves lie in carbonate reservoirs with values estimated at 60% and 40%, respectively (Schlumberger Market Analysis, 2007). The mineralogy of these heterogeneous carbonate formations primarily consists of calcite, dolomite or combinations thereof. Production enhancement methods routinely rely on the use of suitable acid stimulation technologies owing to their proven success and efficiency towards dissolving calcium and magnesium-based carbonates. Several acid platforms have been proposed and are widely used by oil and gas operators to stimulate carbonate formations. These include but are not limited to use of strong mineral acids (for example, hydrochloric acid, HCl), gelled and emulsified acids, organic-based acids such as formic acid ($CH_2O_2$) and acetic acid ($C_2H_4O_2$) and combinations thereof. While these technologies are effective, improvements are needed, for instance to achieve deeper penetration of acid into a reservoir, or to minimize the amount of acid used, or both.

SUMMARY

There exists a need in the oil and gas industry for the controlled delivery of acid to site-specific locations as a means to remediate a wide range of challenges associated with, for example, the high reactivity and corrosive nature of acid, as well as difficulties and safety concerns associated with handling it. As noted supra, the oil and gas industry uses acid systems to stimulate hydrocarbon reservoirs, for instance, carbonate and sandstone reservoirs. Typically, the acid systems are used to create a more conductive flow path for oil or gas to flow, whether by creating wormholes via dissolution of the formation or by mitigating damage in the near well-bore region caused by the drilling process.

Carbonate formations consisting of calcite, dolomite, and the like, are typically stimulated using strong mineral acids, for instance, hydrochloric acid (HCl). In the field, treatment with HCl is often preferred because it reacts with calcite and dolomite to yield products that are readily soluble in water; hence formation damage is negligible. Additionally, an HCl acid system is very cost-effective and thus economically favorable. The longevity and practical application of this treatment however raises serious concerns from both a corrosion standpoint and because the rapid reaction kinetics (rock-HCl) causes the live acid to be spent quickly. As a result, large volumes of acid are required and even still, deeper penetration of live acid into the reservoir is not achieved. Other drawbacks include various safety concerns associated with the transfer and handling of highly corrosive acids at the well site, as well as undesired acid reactions occurring near the wellbore, causing corrosion to drilling equipment, metal tubulars, and casing. Various alternative approaches have been proposed to address these challenges. These include, but are not limited to: (1) organic and synthetic acids, (2) gelled acids, (3) emulsified acids and (4) acid-producing enzymes.

In one aspect, the present application describes technologies relating to compositions and methods for the controlled delivery of acid to a particular location in order to minimize certain challenges described supra. In some embodiments, a composition for the controlled delivery of acid to a particular location comprises a composition capable of enhancing an acidizing treatment, for instance by retarding the reaction of acid with a formation, allowing the acid to more deeply penetrate the formation. In some embodiments, a composition for the controlled delivery of acid to a particular location comprises a composition capable of more deeply penetrating a formation while using less acid as compared to other acid systems known in the art. Exemplary such compositions are described infra.

Without wishing to be bound by theory, it has been unexpectedly found that controlling the available free water in a provided composition facilitates control of the diffusion of acid within the composition, which allows for more controlled delivery of an acid to a particular location. For instance, by reducing the amount of available free water in a provided composition the rate of reaction of an acid with a formation can be retarded, as it restricts the ionic separation of the proton ($H^+$), in other words, the dissociation of the acid is fine-tuned/controlled thus allowing the acid to more deeply penetrate the formation. In some such embodiments, the ratio of strong acid to a second acid or acid-generating compound to water in the aqueous fluid is pre-determined so as to optimize the available free water content in a provided composition in order to achieve the desired level of retardation of reaction rate with a formation. In some such embodiments, compositions comprise a combination of a strong acid (for instance, HCl), a second acid or acid-generating compound, optionally one or more salts, optionally one or more chelants, and optionally one or more additional components as described in this application.

In some embodiments, methods described in this application comprise controlled delivery of acid to a subterranean formation that contains a hydrocarbon reservoir, for instance a carbonate, sandstone, or shale formation. In some embodiments, controlled delivery of acid to a subterranean formation that contains a hydrocarbon reservoir reduces the occurrence of corrosion to drilling equipment, tubing, and casing associated with treatment with an acid. In some embodiments, controlled delivery of acid to a subterranean formation that contains a hydrocarbon reservoir allows for deeper penetration of acid into the formation than would be achieved otherwise. For instance, in some embodiments, this application describes compositions and methods for affording controlled, long-range distribution of channels/wormholes within a formation having the desired etching properties as a means to improve fracture lengths and increase oil and gas production. In some embodiments, this application describes compositions and methods affording minimal face dissolution at higher temperatures (for example, 300° F.), thus maximizing the amount of live acid that penetrates the reservoir and minimizing the amount of acid consumed at, for instance, the near-wellbore. In some embodiments, this application describes compositions and methods for a low-viscosity acid system which inherently facilitates ease of pumping a composition to a desired location with minimal pressure loss due to friction.

This application describes, inter alia, methods for controlling an acid treatment of a subterranean formation that contains a hydrocarbon reservoir, where the aqueous fluid comprises (a) a strong acid; and (b) a second acid or acid-generating compound, where the rate of reaction of the aqueous fluid with the formation is less than the rate of reaction of an aqueous fluid with the formation absent the second acid or acid-generating compound. As described infra, the ratio of strong acid to a second acid or acid-generating compound to water in the aqueous fluid is pre-determined so as to optimize the available free water content in a provided composition in order to achieve the desired level of retardation of reaction rate with a formation.

This application describes, inter alia, methods for removing scale, comprising contacting the scale with an aqueous fluid that comprises (a) a strong acid; and (b) a second acid or acid-generating compound, where the rate of reaction of the aqueous fluid with the formation is less than the rate of reaction of an aqueous fluid with the formation absent the second acid or acid-generating compound. In certain embodiments, the scale is calcium carbonate scale.

This application describes, inter alia, methods for breaking a filter cake, comprising contacting the filter cake with an aqueous fluid that comprises (a) a strong acid; and (b) a second acid or acid-generating compound, where the rate of reaction of the aqueous fluid with the formation is less than the rate of reaction of an aqueous fluid with the formation absent the second acid or acid-generating compound.

Various embodiments of the subject matter described in this application are set forth in the following detailed description and claims.

BRIEF DESCRIPTION OF THE DRAWING

FIG. 1C corresponds to Exp. No. 2; FIG. 1D corresponds to Exp. No. 3; and FIG. 1E corresponds to Exp. No. 4) compared to the untreated sample (FIG. 1A), confirming that formulation No. 4 (FIG. 1E) reduces the reactivity of HCl and enhances the retardation of HCl.

FIG. 2B corresponds to Exp. No. 2; FIG. 2C corresponds to Exp. No. 3; and FIG. 2D corresponds to Exp. No. 4) showing that increasing GLDA concentration reduces the reactivity of HCl and enhances the retardation of HCl.

FIG. 3B corresponds to Exp. No. 2; and FIG. 3C corresponds to Exp. No. 3) showing that increasing OilSafe AR concentration reduces the reactivity of HCl and enhances the retardation of HCl.

DETAILED DESCRIPTION

Figure 1C:
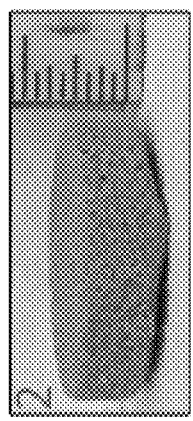
FIGS. 1A-1E. Digital photos of acidized Indiana limestone (Calcite) core samples after dissolution tests (FIGS. 1B-1E, using acid mixtures which correspond to Table 1, Exp. No. 1-4, respectively. Specifically FIG. 1B corresponds to Exp. No. 1.

It is contemplated that systems, devices, methods, and processes of the present application encompass variations and adaptations developed using information from the embodiments described in the following description. Adaptation and/or modification of the methods and processes described in the following description may be performed by those of ordinary skill in the relevant art.

Throughout the description, where compositions, compounds, or products are described as having, including, or comprising specific components, or where processes and methods are described as having, including, or comprising specific steps, it is contemplated that, additionally, there are articles, devices, and systems of the present application that consist essentially of, or consist of, the recited components, and that there are processes and methods according to the present application that consist essentially of, or consist of, the recited processing steps.

It should be understood that the order of steps or order for performing certain action is immaterial so long as the described method remains operable. Moreover, two or more steps or actions may be conducted simultaneously.

The mention in the present application of any publication, for example, in the Background section, is not an admission that the publication serves as prior art with respect to any of the presented claims. The Background section is presented for purposes of clarity and is not meant as a description of prior art with respect to any claim. Headers are provided for the convenience of the reader and are not intended to be limiting with respect to the claimed subject matter.

As described supra, there exists a need in various industries for the controlled delivery of acid, whether inorganic or organic in nature, to site-specific locations as a means to remediate a wide range of challenges associated with, for instance, the corrosive nature of acid, as well as difficulties and safety concerns associated with handling it and controlling the reactivity. Challenges arising during the delivery of certain acid systems include high friction losses resulting from the high viscosity of those acid systems, e.g. gelled and emulsified acids. Accordingly, an aspect of the present technology is the provision of alternative low-viscosity acid systems which inherently facilitate ease of pumping a composition to a desired location with minimal pressure loss due to friction. In some embodiments, such an alternative low-viscosity acid system has an estimated apparent viscosity of, for example, 3 to 10 cP, 3 to 5 cP, 3.5 to 4.5 cP, or about 4 cP at room temperature with an applied shear rate of $1/50$ per second. One manner of controlling delivery of an acid to a site-specific location is by generating the acid in situ. Another manner of controlling delivery of an acid to a site-specific location is by controlling the rate of reaction of the acid with a formation, for instance by slowing the rate of reaction of the acid with the formation. This application contemplates such methods individually and in combination with one another.

As used in this application, "in situ" acid generation refers generally to the generation of acid "in one pot" where a reaction is intended to take place, as opposed to generating acid in one vessel and transferring it to a separate vessel for reaction. In some embodiments, in situ generation of acid comprises generating acid at a desired location where the acid is intended to react, for instance by generating acid in a subterranean reservoir downhole, as opposed to generating acid on the earth's surface and transferring it to a subterranean reservoir downhole. Accordingly, this application describes, inter alia, methods for generating acid (for instance, via in situ generation) using compositions comprising a strong acid (for instance, HCl), a second acid or acid-generating compound, optionally one or more salts, optionally one or more chelants, and optionally one or more additional components as described in this application.

In some embodiments, this application describes compositions and methods for use in matrix acidizing applications, acidizing applications, fracture acidizing applications, formation breakdown using acid, scale removal applications, damage removal applications, hydrate treatment applications, and hydrate inhibition applications.

As described supra, in some embodiments, compositions described in this application are useful in oil and gas applications, for instance for the stimulation of a subterranean formation. In some embodiments, the methods described in this application may involve generating acid upon or after arriving at the formation, for example by delivering reagents described in this application to the formation via a coiled tubing or bull heading in the production tube, depending on whether the application is acid fracturing or matrix acidizing, respectively. In some embodiments, the acid is generated within the formation itself. In some embodiments, the acid is generated prior to contact with the formation.

In some embodiments, the subterranean formation comprises one or more water injector wells, one or more disposal wells, and/or one or more geothermal wells. In some embodiments, the subterranean formation contains a hydrocarbon reservoir. In some embodiments, the subterranean formation comprises carbonates. In some embodiments, the subterranean formation comprises sandstone. In some embodiments, the subterranean formation comprises elastic sedimentary rock. For instance, in some embodiments, the subterranean formation comprises shale.

In some embodiments, compositions and methods described in this application are useful for acidizing a well formation, for instance water injection wells, disposal wells, geothermal wells, or injectors, for instance to improve injectivity. The injector can be a water injector or a gas injector. The disposal well can be a water disposal well or a drill cuttings disposal well.

As compositions and methods described in this application can be useful in a variety of applications in which the controlled delivery of acid is desired, applications of the compositions and methods described in this application are not limited to the oil and gas industry or to other industries contemplated in this application.

Calculating Effective Weight Percent (Ewt %) and Weight Percent (Wt %)

Effective Weight Percent (Ewt %)

In some embodiments, percentage weight of a single solute dissolved in a solution is expressed as "Effective Weight Percent" (Ewt %). Effective Weight Percent is calculated as follows:

$$\text{Ewt \% solute} = (\text{mass solute})/(\text{total mass of solution} - \text{mass solute}).$$

In order to calculate the Effective Weight Percent of a one solute dissolved in a solution comprising multiple solutes, consider a composition comprising components A, B, and C, wherein components A and B are solutes and component C is a solvent. The Effective Weight Percent of component A is calculated as follows:

$$\text{Ewt \% component } A = (\text{mass } A)/(\text{mass } A + \text{mass } B + \text{mass } C - \text{mass } A).$$

$$\text{Ewt \% component } A = (\text{mass } A)/(\text{mass } B + \text{mass } C).$$

To further demonstrate this, take, for example, a composition comprising components A, B, and C, wherein:
component A is hydrochloric acid (HCl);
component B is methanesulfonic acid (MSA); and
component C is water ($H_2O$).

In this scenario, the Effective Weight Percent of HCl is calculated as follows:

$$\text{Ewt \% HCl} = (\text{mass HCl})/(\text{mass MSA} + \text{mass } H_2O).$$

For a composition comprising 92.5 mL of a 32 wt % HCl stock solution, 125 mL of a 70 wt % MSA stock solution, and 31.3 mL of neat $H_2O$, the Effective Weight Percent of HCl is calculated as follows:

TABLE A

| Stock | Density at 25° C. | Volume used | Mass Stock used | Mass HCl | Mass MSA | Mass $H_2O$ |
|---|---|---|---|---|---|---|
| 32 wt % HCl stock | 1.161 g/mL | 92.5 mL | 107.4 g | 34.4 g | — | 73.0 g |
| 70 wt % MSA stock | 1.319 g/mL | 125.0 mL | 164.9 g | — | 115.4 g | 49.5 g |
| Neat $H_2O$ | 0.997 g/mL | 31.3 mL | 31.2 g | — | — | 31.2 g |

$$\text{Ewt \% HCl} = (34.4 \text{ g HCl})/(115.4 \text{ g MSA} + (73.0 + 49.5 + 31.2) \text{g } H_2O)$$

$$\text{Ewt \% HCl} = (34.4 \text{ g HCl})/(115.4 \text{ g MSA} + 153.7 \text{ g } H_2O)$$

$$\text{Ewt \% HCl} \approx 13\%$$

Weight Percent (Wt %)

In some embodiments, percentage weight of a single solute within a solution is expressed as "Weight Percent" (wt %). Weight Percent is calculated as follows:

$$\text{wt \% solute} = (\text{mass solute})/(\text{mass solute} + \text{mass solvent}).$$

The Weight Percent of HCl for the demonstration in Table A is calculated as follows:

$$\text{wt \% HCl} = (34.4 \text{ g HCl})/(34.4 \text{ g HCl} + (73.0 + 49.5 + 31.2) \text{g H}_2\text{O})$$

$$\text{wt \% HCl} = (34.4 \text{ g HCl})/(34.4 \text{ g HCl} + 153.7 \text{ g H}_2\text{O})$$

$$\text{wt \% HCl} \approx 18\%$$

The Weight Percent of MSA for the demonstration in Table A is calculated as follows:

$$\text{wt \% MSA} = (115.4 \text{ g MSA})/(115.4 \text{ g MSA} + (73.0 + 49.5 + 31.2) \text{g H}_2\text{O})$$

$$\text{wt \% MSA} = (115.4 \text{ g MSA})/(115.4 \text{ g MSA} + 153.7 \text{ g H}_2\text{O})$$

$$\text{wt \% MSA} \approx 43\%$$

Compositions

Described in this application are, inter alia, compositions useful for the controlled delivery of acid, comprising a combination of a strong acid (for instance, HCl), a second acid or acid-generating compound, optionally one or more salts, optionally one or more chelants, and optionally one or more additional components as described in this application. Exemplary such strong acids, second acid or acid-generating compound, salts, chelants, and optional components are described further infra.

In some embodiments, a composition comprises an aqueous fluid for the controlled delivery of acid, where the aqueous fluid comprises (a) a strong acid; and (b) a second acid or acid-generating compound, where the rate of reaction of the aqueous fluid with the formation is less than the rate of reaction of an aqueous fluid with the formation absent the second acid or acid-generating compound.

In some embodiments, a composition comprises an aqueous fluid for acid stimulation of a subterranean formation that contains a hydrocarbon reservoir, where the aqueous fluid comprises (a) a strong acid; and (b) a second acid or acid-generating compound, where the rate of reaction of the aqueous fluid with the formation is less than the rate of reaction of an aqueous fluid with the formation absent the second acid or acid-generating compound.

In some embodiments, an aqueous fluid of the present application contains at least 10 Ewt % HCl, at least 11 Ewt % HCl, at least 12 Ewt % HCl, at least 13 Ewt % HCl, at least 14 Ewt % HCl, at least 15 Ewt % HCl, at least 16 Ewt % HCl, at least 17 Ewt % HCl, at least 18 Ewt % HCl, at least 19 Ewt % HCl, or at least 20 Ewt % HCl. In some embodiments, an aqueous fluid of the present application contains between 10 and 20 Ewt % HCl, for example between 11 and 19 Ewt % HCl, between 11 and 18 Ewt % HCl, between 11 and 17 Ewt % HCl, between 12 and 17 Ewt % HCl, between 12 and 16 Ewt % HCl, between 12 and 15 Ewt % HCl, between 12 and 14 Ewt % HCl, between 12 and 13 Ewt % HCl, or between 13 and 14 Ewt % HCl.

In some embodiments, an aqueous fluid of the present application contains at least 10 wt %, at least 11 wt %, at least 12 wt %, at least 13 wt %, at least 14 wt %, at least 15 wt %, at least 16 wt %, at least 17 wt %, at least 18 wt %, at least 19 wt %, at least 20 wt %, at least 21 wt %, at least 22 wt %, at least 23 wt %, at least 24 wt %, at least 25 wt %, at least 26 wt %, at least 27 wt %, at least 28 wt %, at least 29 wt %, or at least 30 wt % HCl. In some embodiments, an aqueous fluid of the present application contains between 10 and 30 wt % HCl, for example between 11 and 29 wt % HCl, between 12 and 28 wt % HCl, between 13 and 27 wt % HCl, between 14 and 26 wt % HCl, between 15 and 25 wt % HCl, between 17 and 25 wt % HCl, between 19 and 25 wt % HCl, between 19 and 23 wt % HCl, or between 19 and 21 wt % HCl.

Strong Acids

Compositions described in this application for the controlled delivery of acid comprise one or more strong acids. In some embodiments, the one or more strong acids is present in an aqueous fluid. As described supra, the one or more strong acids is present in a particular ratio with the second acid or acid-generating compound such that the resulting aqueous fluid achieves a particular level of available free water that results in the aqueous fluid having a reduced rate of reaction with a formation, for instance a carbonate or sandstone formation, as compared to other acid systems known in the art. In some embodiments, a strong acid comprises an acid having a pKa as measured in water of less than 2, less than 1, less than 0, less than −1, less than −2, less than −3, less than −4, less than −5, less than −6, or less than −7. In some embodiments, a strong acid comprises an acid having a pKa as measured in water of between 2 and −7. In some embodiments, a strong acid comprises an acid having a pKa as measured in water of between 1 and −7. In some embodiments, a strong acid comprises an acid having a pKa as measured in water of between −1 and −7. In some embodiments, a strong acid comprises an acid having a pKa as measured in water of between −2 and −7. In some embodiments, a strong acid comprises an acid having a pKa as measured in water of between −3 and −7. In some embodiments, a strong acid comprises an acid having a pKa as measured in water of between −4 and −7. In some embodiments, a strong acid comprises an acid having a pKa as measured in water of between −5 and −7. In some embodiments, a strong acid comprises an acid having a pKa as measured in water of between −6 and −7.

In some embodiments, a strong acid comprises a mineral acid.

In some embodiments, a strong acid comprises HCl, chloric acid ($HClO_3$), hydrobromic acid (HBr), sulfuric acid ($H_2SO_4$), nitric acid ($HNO_3$), perchloric acid ($HClO_4$), hydroiodic acid (HI), phosphoric acid ($H_3PO_4$), or any combination thereof.

In certain embodiments, a strong acid comprises HCl.

Various other strong acids are well known to those of skill in the chemical arts and are contemplated for use in compositions and methods described in this application.

In some embodiments, a strong acid is present in a composition at a concentration in the range of 5 Ewt % to 25 Ewt %. In some embodiments, a strong acid is present in an aqueous fluid of the present application at a concentration in the range of 10 Ewt % to 20 Ewt %. In some embodiments, a strong acid is present in an aqueous fluid at a concentration in the range of 11 Ewt % to 20 Ewt %. In some embodiments, a strong acid is present in an aqueous fluid at a concentration in the range of 12 Ewt % to 19 Ewt %. In some embodiments, a strong acid is present in an aqueous fluid at a concentration in the range of 13 Ewt % to 19 Ewt %. In some embodiments, a strong acid is present in an aqueous fluid at a concentration in the range of 13 Ewt % to 18 Ewt %.

In some embodiments, a strong acid is present in an aqueous fluid of the present application at a concentration in the range of 10 Ewt % to 13 Ewt %. In some embodiments, a strong acid is present in an aqueous fluid at a concentration in the range of 11 Ewt % to 14 Ewt %. In some embodiments, a strong acid is present in an aqueous fluid at a concentration in the range of 12 Ewt % to 15 Ewt %. In some embodiments, a strong acid is present in an aqueous fluid at a concentration in the range of 13 Ewt % to 16 Ewt %. In some embodiments, a strong acid is present in an aqueous fluid at a concentration in the range of 14 Ewt % to 17 Ewt %. In some embodiments, a strong acid is present in an aqueous fluid at a concentration in the range of 15 Ewt % to 18 Ewt %. In some embodiments, a strong acid is present in an aqueous fluid at a concentration in the range of 16 Ewt % to 19 Ewt %. In some embodiments, a strong acid is present in an aqueous fluid at a concentration in the range of 17 Ewt % to 20 Ewt %.

In some embodiments, a strong acid is present in an aqueous fluid of the present application at a concentration in the range of 10 Ewt % to 12 Ewt %. In some embodiments, a strong acid is present in an aqueous fluid at a concentration in the range of 11 Ewt % to 13 Ewt %. In some embodiments, a strong acid is present in an aqueous fluid at a concentration in the range of 12 Ewt % to 14 Ewt %. In some embodiments, a strong acid is present in an aqueous fluid at a concentration in the range of 13 Ewt % to 15 Ewt %. In some embodiments, a strong acid is present in an aqueous fluid at a concentration in the range of 14 Ewt % to 16 Ewt %. In some embodiments, a strong acid is present in an aqueous fluid at a concentration in the range of 15 Ewt % to 17 Ewt %. In some embodiments, a strong acid is present in an aqueous fluid at a concentration in the range of 16 Ewt % to 18 Ewt %. In some embodiments, a strong acid is present in an aqueous fluid at a concentration in the range of 17 Ewt % to 19 Ewt %. In some embodiments, a strong acid is present in an aqueous fluid at a concentration in the range of 18 Ewt % to 20 Ewt %.

In some embodiments, a strong acid is present in an aqueous fluid of the present application at a concentration of about 10 Ewt %, about 11 Ewt %, about 12 Ewt %, about 13 Ewt %, about 14 Ewt %, about 15 Ewt %, about 16 Ewt %, about 17 Ewt %, about 18 Ewt %, about 19 Ewt %, or about 20 Ewt %.

In some such embodiments, the strong acid is HCl.

In some embodiments, a strong acid is present in a composition at a concentration in the range of 10 wt % to 30 wt %. In some embodiments, a strong acid is present in an aqueous fluid of the present application at a concentration in the range of 15 wt % to 25 wt %. In some embodiments, a strong acid is present in an aqueous fluid at a concentration in the range of 16 wt % to 25 wt %. In some embodiments, a strong acid is present in an aqueous fluid at a concentration in the range of 17 wt % to 25 wt %. In some embodiments, a strong acid is present in an aqueous fluid at a concentration in the range of 18 wt % to 25 wt %. In some embodiments, a strong acid is present in an aqueous fluid at a concentration in the range of 18 wt % to 23 wt %.

In some embodiments, a strong acid is present in an aqueous fluid of the present application at a concentration in the range of 15 wt % to 18 wt %. In some embodiments, a strong acid is present in an aqueous fluid at a concentration in the range of 16 wt % to 19 wt %. In some embodiments, a strong acid is present in an aqueous fluid at a concentration in the range of 17 wt % to 20 wt %. In some embodiments, a strong acid is present in an aqueous fluid at a concentration in the range of 18 wt % to 21 wt %. In some embodiments, a strong acid is present in an aqueous fluid at a concentration in the range of 19 wt % to 22 wt %. In some embodiments, a strong acid is present in an aqueous fluid at a concentration in the range of 20 wt % to 23 wt %. In some embodiments, a strong acid is present in an aqueous fluid at a concentration in the range of 21 wt % to 24 wt %. In some embodiments, a strong acid is present in an aqueous fluid at a concentration in the range of 22 wt % to 25 wt %.

In some embodiments, a strong acid is present in an aqueous fluid of the present application at a concentration in the range of 15 wt % to 17 wt %. In some embodiments, a strong acid is present in an aqueous fluid at a concentration in the range of 16 wt % to 18 wt %. In some embodiments, a strong acid is present in an aqueous fluid at a concentration in the range of 17 wt % to 19 wt %. In some embodiments, a strong acid is present in an aqueous fluid at a concentration in the range of 18 wt % to 20 wt %. In some embodiments, a strong acid is present in an aqueous fluid at a concentration in the range of 19 wt % to 21 wt %. In some embodiments, a strong acid is present in an aqueous fluid at a concentration in the range of 20 wt % to 22 wt %. In some embodiments, a strong acid is present in an aqueous fluid at a concentration in the range of 21 wt % to 23 wt %. In some embodiments, a strong acid is present in an aqueous fluid at a concentration in the range of 22 wt % to 24 wt %. In some embodiments, a strong acid is present in an aqueous fluid at a concentration in the range of 23 wt % to 25 wt %.

In some embodiments, a strong acid is present in an aqueous fluid of the present application at a concentration of about 15 wt %, about 16 wt %, about 17 wt %, about 18 wt %, about 19 wt %, about 20 wt %, about 21 wt %, about 22 wt %, about 23 wt %, about 24 wt %, or about 25 wt %.

In some such embodiments, the strong acid is HCl.

Second Acid or Acid-Generating Compound

Compositions described in this application for the controlled delivery of acid comprise a second acid or acid-generating compound. In some embodiments, the second acid or acid-generating compound is present in an aqueous fluid. As described supra, the second acid or acid-generating compound is present in a particular ratio with a strong acid such that the resulting aqueous fluid achieves a particular level of available free water, which results in the aqueous fluid having a reduced rate of reaction with a formation, for instance a carbonate or sandstone formation, as compared to other acid systems known in the art.

In some embodiments, the second acid or acid-generating compound comprises an organic acid.

In some embodiments, the second acid or acid-generating compound comprises is an oxoacid.

In some embodiments, the organic acid is a sulfonic acid, for instance, methanesulfonic acid (MSA).

In some embodiments, the organic acid is an acid comprising one or more carboxylic acids. In some embodiments, the organic acid is a polycarboxylic acid. For instance, in some embodiments, the organic acid is an acid comprising at least two, three, four, five, six, seven, eight, nine, or ten carboxylic acids. Exemplary such carboxylic acids are well known to those of skill in the chemical arts and are contemplated for use in compositions and methods described in this application.

In some embodiments, the organic acid is halogenated.

In some embodiments, the organic acid is a heterofunctional organic acid, for instance, 4,5-imidazoledicarboxylic acid. Other such heterofunctional organic acids are known to those of skill in the art and contemplated herein.

Exemplary organic acids include, but are not limited to, alkanesulfonic acids, arylsulfonic acids, formic acid, acetic acid, methanesulfonic acid, p-toluenesulfonic acid, alkyl carboxylic acids, aryl carboxylic acids, lactic acid, glycolic acid, malonic acid, fumaric acid, citric acid, tartaric acid, chloroacetic acid, dichloroacetic acid, trichloroacetic acid, fluoroacetic acid, difluoroacetic acid, trifluoroacetic acid, glutamic acid diacetic acid, methylglycindiacetic acid, 4,5-imidazoledicarboxylic acid, or any combination thereof. Various other organic acids are well known to those of skill in the chemical arts and are contemplated for use in compositions and methods described in this application.

In some embodiments, the second acid or acid-generating compound is methanesulfonic acid.

In some embodiments, the second acid or acid-generating compound is also a chelant. For instance, in some embodiments, the second acid or acid-generating compound is glutamic acid diacetic acid.

In some embodiments, the second acid or acid-generating compound is selected from the group consisting of any esters and formates that are water soluble or partially water soluble. Exemplary acid-generating compounds include lactic acid derivatives, methyl lactate, ethyl lactate, propyl lactate, and butyl lactate. In some embodiments, the acid-generating compound is a formate ester including, but are not limited to, ethylene glycol monoformate, ethylene glycol diformate, diethylene glycol diformate, glyceryl monoformate, glyceryl diformate, glyceryl triformate, triethylene glycol diformate, and formate esters of pentaerythritol. In certain embodiments, the acid-generating compound is ethylene glycol monoformate or diethylene glycol diformate. In some embodiments, the acid-generating compound is a nitrile-containing compound. In some embodiments, the acid-generating compound is an ester, for instance, polyesters of glycerol including, but not limited to, tripropionin (a triester of propionic acid and glycerol), trilactin, and esters of acetic acid and glycerol such as monoacetin, diacetin, and triacetin. In some embodiments, the acid-generating compound(s) may include esters, aliphatic polyesters, poly(lactides), poly(glycolides, poly(E-caprolactones), poly(hydroxybutyrates), poly(anhydrides), aliphatic polycarbonates, poly(amino acids), and polyphosphazenes, or copolymers thereof, or derivatives and combinations are also suitable.

In some embodiments, the second acid or acid-generating compound comprises esters, aliphatic polyesters, orthoesters, poly(orthoesters), poly(lactides), poly(glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, or any combination thereof.

In some embodiments, the second acid or acid-generating compound is present in an aqueous fluid at a concentration in the range of 20 wt % to 70 wt %. In some embodiments, the second acid or acid-generating compound is present in an aqueous fluid at a concentration in the range of 20 wt % to 65 wt %. In some embodiments, the second acid or acid-generating compound is present in an aqueous fluid at a concentration in the range of 20 wt % to 60 wt %. In some embodiments, the second acid or acid-generating compound is present in an aqueous fluid at a concentration in the range of 20 wt % to 55 wt %. In some embodiments, the second acid or acid-generating compound is present in an aqueous fluid at a concentration in the range of 20 wt % to 50 wt %. In some embodiments, the second acid or acid-generating compound is present in an aqueous fluid at a concentration in the range of 20 wt % to 45 wt %. In some embodiments, the second acid or acid-generating compound is present in an aqueous fluid at a concentration in the range of 25 wt % to 60 wt %. In some embodiments, the second acid or acid-generating compound is present in an aqueous fluid at a concentration in the range of 30 wt % to 60 wt %. In some embodiments, the second acid or acid-generating compound is present in an aqueous fluid at a concentration in the range of 35 wt % to 60 wt %. In some embodiments, the second acid or acid-generating compound is present in an aqueous fluid at a concentration in the range of 40 wt % to 60 wt %. In some embodiments, the second acid or acid-generating compound is present in an aqueous fluid at a concentration in the range of 41 wt % to 59 wt %. In some embodiments, the second acid or acid-generating compound is present in an aqueous fluid at a concentration in the range of 42 wt % to 58 wt %. In some embodiments, the second acid or acid-generating compound is present in an aqueous fluid at a concentration in the range of 42 wt % to 57 wt %. In some embodiments, the second acid or acid-generating compound is present in an aqueous fluid at a concentration in the range of 42 wt % to 56 wt %. In some embodiments, the second acid or acid-generating compound is present in an aqueous fluid at a concentration in the range of 42 wt % to 55 wt %. In some embodiments, the second acid or acid-generating compound is present in an aqueous fluid at a concentration in the range of 42 wt % to 54 wt %. In some embodiments, the second acid or acid-generating compound is present in an aqueous fluid at a concentration in the range of 42 wt % to 53 wt %. In some embodiments, the second acid or acid-generating compound is present in an aqueous fluid at a concentration of about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt %.

In some embodiments, the second acid or acid-generating compound is glutamic acid diacetic acid (GLDA).

In some such embodiments, HCl is present in a range of 5 Ewt % to 20 Ewt % and GLDA is present in a range of 5 wt % to 60 wt %. In some such embodiments, HCl is present in a range of 10 Ewt % to 20 Ewt % and GLDA is present in a range of 10 wt % and 50 wt %. In some such embodiments, HCl is present in a range of 10 Ewt % to 20 Ewt % and GLDA is present in a range of 45 wt % to 55 wt %. In some such embodiments, HCl is present in a range of 11 Ewt % to 19 Ewt % and GLDA is present in a range of 45 wt % to 55 wt %. In some such embodiments, HCl is present in a range of 12 Ewt % to 18 Ewt % and GLDA is present in a range of 45 wt % to 55 wt %. In some such embodiments, HCl is present in a range of 12 Ewt % to 18 Ewt % and GLDA is present in a range of 46 wt % to 54 wt %. In some such embodiments, HCl is present in a range of 12 Ewt % to 18 Ewt % and GLDA is present in a range of 47 wt % and 53 wt %. In some such embodiments, HCl is present in a range of 12 Ewt % to 18 Ewt % and GLDA is present in a range of 48 wt % and 52 wt %.

In some embodiments, HCl is present in a range of 5 wt % to 30 wt % and GLDA is present in a range of 5 wt % to 60 wt %. In some such embodiments, HCl is present in a range of 13 wt % to 27 wt % and GLDA is present in a range of 10 wt % and 50 wt %. In some such embodiments, HCl is present in a range of 13 wt % to 27 wt % and GLDA is present in a range of 45 wt % to 55 wt %. In some such embodiments, HCl is present in a range of 14 wt % to 26 wt % and GLDA is present in a range of 45 wt % to 55 wt %. In some such embodiments, HCl is present in a range of 15 wt % to 25 wt % and GLDA is present in a range of 45 wt % to 55 wt %. In some such embodiments, HCl is present in a range of 15 wt % to 25 wt % and GLDA is present in a range of 46 wt % to 54 wt %. In some such embodiments, HCl is present in a range of 15 wt % to 25 wt % and GLDA is present in a range of 47 wt % to 53 wt %. In some such embodiments, HCl is present in a range of 15 wt % to 25 wt % and GLDA is present in a range of 48 wt % and 52 wt %.

In some embodiments, the second acid or acid-generating compound is methanesulfonic acid (MSA).

In some such embodiments, HCl is present in a range of 5 Ewt % to 20 Ewt % and MSA is present in a range of 10 wt % to 70 wt %. In some such embodiments, HCl is present in a range of 10 Ewt % to 20 Ewt % and MSA is present in a range of 20 wt % to 60 wt %. In some such embodiments, HCl is present in a range of 10 Ewt % to 20 Ewt % and MSA is present in a range of 40 wt % to 60 wt %. In some such embodiments, HCl is present in a range of 11 Ewt % to 19 Ewt % and MSA is present in a range of 40 wt % to 60 wt %. In some such embodiments, HCl is present in a range of 12 Ewt % to 15 Ewt % and MSA is present in a range of 40 wt % to 55 wt %. In some such embodiments, HCl is present in a range of 12 wt % to 15 wt % and MSA is present in a range of 42 wt % to 54 wt %. In some such embodiments, HCl is present in a range of 12 Ewt % to 15 Ewt % and MSA is present in a range of 42 wt % and 50 wt %. In some such embodiments, HCl is present in a range of 12 Ewt % to 15 Ewt % and MSA is present in a range of 42 wt % and 45 wt %.

In some embodiments, HCl is present in a range of 10 wt % to 30 wt % and MSA is present in a range of 40 wt % to 60 wt %. In some such embodiments, HCl is present in a range of 15 wt % to 25 wt % and MSA is present in a range of 40 wt % and 60 wt %. In some such embodiments, HCl is present in a range of 17 wt % to 25 wt % and MSA is present in a range of 40 wt % to 60 wt %. In some such embodiments, HCl is present in a range of 17 wt % to 25 wt % and MSA is present in a range of 40 wt % to 55 wt %. In some such embodiments, HCl is present in a range of 17 wt % to 25 wt % and MSA is present in a range of 42 wt % to 54 wt %. In some such embodiments, HCl is present in a range of 17 wt % to 25 wt % and MSA is present in a range of 42 wt % to 50 wt %. In some such embodiments, HCl is present in a range of 17 wt % to 25 wt % and MSA is present in a range of 42 wt % and 45 wt %.

One of skill in the art guided by the present specification will appreciate that the particular ratio of strong acid to second acid or acid-generating compound will depend on the particular acids chosen and will be selected to achieve an amount of available free water in the aqueous fluid composition such that the rate of reaction of acid with a formation will be optimized for a particular use. For instance, in some embodiments, a ratio of strong acid to second acid or acid-generating compound is selected such that the amount of available free water in the system is reduced, in order to achieve a reduced rate of reaction with a formation.

Salts

Compositions described in this application for the controlled delivery of acid optionally comprise one or more salts. In some embodiments, the presence of one or more salts can contribute to the retardation of a composition's reaction rate with a formation. In some embodiments, the presence of one or more salts can speed up a composition's reaction rate with a formation. In some embodiments, the presence of one or more salts can contribute to the retardation of a composition's reaction rate with a formation by precipitation of said salts during reaction with a formation. In some embodiments, the one or more salt is any of those known in the art for use in completion fluids.

In some embodiments, the salt comprises an inorganic salt.

In some embodiments, the salt comprises an organic salt.

In some embodiments, the salt comprises chloride salts, bromide salts, formate salts, or combinations thereof.

Exemplary salts include, but are not limited to, $CaCl_2$, NaCl, KCl, $CaBr_2$, NaBr, KBr, calcium formate, or combinations thereof. Other such salts are known to those of skill in the art and are contemplated herein.

Chelants

Compositions described in this application for the controlled delivery of acid optionally comprise one or more chelants. In some embodiments, the one or more chelants is present in an aqueous fluid. In some embodiments, a chelant comprises any agent capable of chelating one or more salts formed during the controlled delivery of acid.

In some embodiments, a chelant is an organic chelant.

In some embodiments, a chelant is an inorganic chelant.

In some embodiments, a chelant comprises compounds which are monodentate, bidentate, tridentate, tetradentate, pentadentate, hexadentate, septadentate, octadentate, or a combination thereof.

Exemplary chelants include, but are not limited to, phosphonic acid, 3-chloropropyl phosphonic acid, aminotris (methylene phosphonic acid) (ATMP), bis(hexamethylenetriaminepenta(methylene phosphonic acid) (BHMTPMPA), 1,2-cyclohexanediaminetetraacetic acid (CDTA), 1,4,7,10-tetraazacyclododecane-1,4,7,10-tetraacetic acid (DOTA), 1,4,7,10-tetraazacyclodedecane-1,4,7,10-tetraphosphonic acid (DOTP), diethylenetriamineepentaacetic acid (DTPA), diethylenetriaminepenta (methylene phosphonic acid) (DTPMP), ethanol-diglycinic acid (EDG), ethylenediamineteraacetic acid (EDTA), ethylene diamine tetra (methylene phosphonic acid) (EDTMPA), ethylenedioxybis(ethyliminodi(acetic acid)) (EGTA), L-glutamic acid N,N-diacetic acid, tetra sodium salt (GLDA), hydroxyaminocarboxylic acid (HACA), 1-hydroxyethane 1,1-diphosphonic acid (HEDP), N-hydroxyethyl-ethylenediamine-triacetic acid (HEDTA), hydroxyethyleneiminodiacetate (HEIDA), N''-carboxymethyldiethylenetriamine-N,N,N', N''-tetraacetate (HDTPA), iminodiacetic acid (IDA), methylglycinediacetic acid (MGDA), N,N'-bis(carboxymethyl) glycine (NTA), nitrolotripropionic acid (NTP), nitrilotrimethylenephosphonic acid (NTMP), sodium hexametaphosphate (SHMP), tetraammonium EDTA, triethylenetetramine-N,N,N',N'',N''',N'''-hexaacetic acid (and N,N'-bis(butanamide) derivative) (TTHA), terpyridine, bypyridiene, triethylenetetramine, biethylenetriamine, bis (hexamethylenetriamine) (BHMT), and derivatives and mixtures thereof.

In some embodiments, a chelant is present in an aqueous fluid at a concentration in the range of 0.001 M up to saturation as measured at 20° C. In some embodiments, a chelant is present in an aqueous fluid at a concentration in the range of 0.005 M to 0.01 M, or 0.005 M to 0.09 M, or 0.005 M to 0.08 M, or 0.005 M to 0.07 M, or 0.005 M to 0.06 M, or 0.005 M to 0.05 M. or 0.01 M to 0.04 M, or 0.02 M to 0.04 M, or 0.025 M to 0.04 M, or 0.03 M to 0.04 M.

In some embodiments, a chelant is present in an aqueous fluid in the range of 1 lb chelant/1000 gallons of aqueous fluid to 300 lb chelant/1000 gallons of aqueous fluid, or 5 lb chelant/1000 gallons of aqueous fluid to 300 lb chelant/1000 gallons of aqueous fluid, 25 lb chelant/1000 gallons of aqueous fluid to 300 lb chelant/1000 gallons of aqueous fluid, or 50 lb chelant/1000 gallons of aqueous fluid to 300 lb chelant/1000 gallons of aqueous fluid, or 100 lb chelant/1000 gallons of aqueous fluid to 300 lb chelant/1000 gallons of aqueous fluid, or 200 lb chelant/1000 gallons of aqueous fluid to 300 lb chelant/1000 gallons of aqueous fluid. In some embodiments, a chelant is present in an aqueous fluid in the range of 1 lb chelant/1000 gallons of aqueous fluid to 900 lb chelant/1000 gallons of aqueous fluid, 1 lb chelant/

1000 gallons of aqueous fluid to 800 lb chelant/1000 gallons of aqueous fluid, 1 lb chelant/1000 gallons of aqueous fluid to 700 lb chelant/1000 gallons of aqueous fluid, 1 lb chelant/1000 gallons of aqueous fluid to 600 lb chelant/1000 gallons of aqueous fluid, 1 lb chelant/1000 gallons of aqueous fluid to 500 lb chelant/1000 gallons of aqueous fluid, 1 lb chelant/1000 gallons of aqueous fluid to 400 lb chelant/1000 gallons of aqueous fluid, 1 lb chelant/1000 gallons of aqueous fluid to 300 lb chelant/1000 gallons of aqueous fluid, 1 lb chelant/1000 gallons of aqueous fluid to 200 lb chelant/1000 gallons of aqueous fluid, 1 lb chelant/1000 gallons of aqueous fluid to 100 lb chelant/1000 gallons of aqueous fluid In some embodiments, an aqueous fluid comprises up to 60 wt % chelant. In some embodiments, an aqueous fluid comprises up to 50 wt % chelant. In some embodiments, an aqueous fluid comprises up to 45 wt % chelant. In some embodiments, an aqueous fluid comprises up to 40 wt % chelant. In some embodiments, an aqueous fluid comprises up to 35 wt % chelant. In some embodiments, an aqueous fluid comprises up to 30 wt % chelant. In some embodiments, an aqueous fluid comprises up to 25 wt % chelant. In some embodiments, an aqueous fluid comprises up to 20 wt % chelant. In some embodiments, an aqueous fluid comprises up to 15 wt % chelant. In some embodiments, an aqueous fluid comprises up to 10 wt % chelant. In some embodiments, an aqueous fluid comprises up to 5 wt % chelant.

In some embodiments, a chelant is present in an aqueous fluid at a concentration in the range of 20 wt % to 70 wt %. In some embodiments, a chelant is present in an aqueous fluid at a concentration in the range of 20 wt % to 65 wt %. In some embodiments, a chelant is present in an aqueous fluid at a concentration in the range of 20 wt % to 60 wt %. In some embodiments, a chelant is present in an aqueous fluid at a concentration in the range of 20 wt % to 55 wt %. In some embodiments, a chelant is present in an aqueous fluid at a concentration in the range of 20 wt % to 50 wt %. In some embodiments, a chelant is present in an aqueous fluid at a concentration in the range of 20 wt % to 45 wt %. In some embodiments, a chelant is present in an aqueous fluid at a concentration in the range of 20 wt % to 40 wt %. In some embodiments, a chelant is present in an aqueous fluid at a concentration in the range of 20 wt % to 30 wt %. In some embodiments, a chelant is present in an aqueous fluid at a concentration in the range of 25 wt % to 60 wt %. In some embodiments, a chelant is present in an aqueous fluid at a concentration in the range of 30 wt % to 60 wt %. In some embodiments, a chelant is present in an aqueous fluid at a concentration in the range of 35 wt % to 60 wt %. In some embodiments, a chelant is present in an aqueous fluid at a concentration in the range of 40 wt % to 60 wt %. In some embodiments a chelant is present in an aqueous fluid at a concentration in the range of 50 wt % to 60 wt %. In some embodiments, a chelant is present in an aqueous fluid at a concentration of about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, or about 60 wt %.

In some embodiments, a chelant is also an organic acid, for instance, GLDA.

Additional Components

Compositions described in this application for the controlled delivery of acid optionally comprise one or more surfactants, for example, to improve the compatibility of the fluids described in this application with other fluids (for instance, formation fluids) that may be present in the well bore or reduce interfacial tension. One of ordinary skill in the art with the benefit of this disclosure will be able to identify the type of surfactant as well as the appropriate concentration of surfactant to be used. Suitable surfactants may be used in a liquid or powder form. Where used, surfactants are present in the fluids in an amount sufficient to prevent incompatibility with formation fluids and/or well bore fluids. If included, a surfactant may be added in an amount of from 1/10th of a gallon per 1000 gallons up to 10% by volume. In some embodiments where liquid surfactants are used, the surfactants are generally present in an amount in the range of between 0.01% to 10% by volume of a fluid. In some embodiment, the liquid surfactants are present in an amount in the range of between 0.1% to 10% by volume of the fluid. In some embodiments, where powdered surfactants are used, the surfactants may be present in an amount in the range of between 0.001% to 10% by weight of the fluid. Examples of suitable surfactants are non-emulsifiers commercially available from Halliburton Energy Services, Inc., of Duncan, Okla., under the tradenames "LOSURF-259™" nonionic nonemulsifier, "LOSURF-300™" nonionic surfactant, "LOSURF-357™" nonionic surfactant, and "LOSURF-400™" surfactant. Another example of a suitable surfactant is a non-emulsifier commercially available from Halliburton Energy Services, Inc., of Duncan, Okla., under the tradename "NEA-96M™" Surfactant. In some embodiments, it is beneficial to add a surfactant to a viscosified fluid of a composition as described in this application as that fluid is being pumped down hole to help eliminate the possibility of foaming if so desired. In some embodiments, for instance those that include a surfactant as described supra, mutual solvents may be beneficially employed. Mutual solvents may help keep other additives in solution. Suitable mutual solvents include, but are not limited to, Halliburton's MUSOL® Mutual Solvent, MUSOL® A Mutual Solvent, MUSOL® E Mutual Solvent, ethyleneglycolmonobutylether, propyleneglycolmonobutylether, water, methanol, isopropyl alcohol, alcohol ethers, aromatic solvents, other hydrocarbons, mineral oils, paraffins, and derivatives and combinations thereof. Other suitable solvents may also be used. If used, the mutual solvent may be included in an amount of between 1% to 20% by volume, in certain embodiments in an amount between 5% to 10% by volume.

In some embodiments, compositions described in this application for the controlled delivery of acid are in the form of an emulsion. In some embodiments, an emulsion comprises a suitable surfactant, for instance, any of those described supra.

Emulsifying surfactants are known in the art and include nonionic surfactants such as sorbitan esters, AF-61™ Emulsifier, and AF-70™ Emulsifier. In some embodiments, a surfactant is an oil external surfactant, for instance, AF-61™ Emulsifer and AF-70™ Emulsifier. For water external emulsions, exemplary surfactants include SEM-7™ Emulsifier, WS-36™ Dispersant, and WS-44™ Emulsifier. If a surfactant is used, generally an amount between 0.1% to 3% based on volume is sufficient. In some embodiments, the emulsion can be mixed and then pumped. In some embodiments, the components can be pumped and then mixed down hole.

In some embodiments, a surfactant is a viscoelastic surfactant.

Compositions described in this application for the controlled delivery of acid optionally comprise one or more viscosifying agents. In some embodiments, a composition is viscosified by a polymer system, for instance a cross-linked polymer system, where the crosslinker comprises zirconium or ferric metal clusters.

Compositions described in this application for the controlled delivery of acid optionally comprise one or more gelling agents. Any gelling agent suitable for use in subterranean applications may be used in these fluids, including, but not limited to, natural biopolymers, synthetic polymers, cross-linked gelling agents, viscoelastic surfactants, and the like. Guar and xanthan are examples of suitable gelling agents. A variety of gelling agents may be used, including hydratable polymers that contain one or more functional groups such as hydroxyl, carboxyl, sulfate, sulfonate, amino or amide groups. Suitable gelling agents comprise polysaccharides, biopolymers, synthetic polymers, or a combination thereof. Examples of suitable polymers include, but are not limited to, guar gum and derivatives thereof, such as hydroxypropyl guar and carboxymethylhydroxypropyl guar, cellulose derivatives, such as hydroxyethyl cellulose, locust bean gum, tara, konjak, tamarind, starch, cellulose, karaya, diutan, scleroglucan, wellan, gellan, xanthan, tragacanth, and carrageenan, and derivatives and combinations of one or more of such polymers.

Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents are polymers and/or copolymers consisting of various ratios of acrylic, acrylamide, acrylamidomethylpropane sulfonic acid, quaternized dimethylaminoethylacrylate, quaternized dimethylaminoethylmethacrylate, mixtures thereof, and the like. Examples may be shown in these references, the disclosures of which are incorporated herein by reference: Chatterji, J. and Borchardt, J. K.: "Application of Water-Soluble Polymers in the Oilfield," paper SPE 9288 presented at the 1980 Annual Technical Conference, Dallas, Tex., September 21-24; Norman, L. R., Conway, M. W., and Wilson, J. M.: "Temperature-Stable Acid Gelling Polymers: Laboratory Evaluation and Field Results," paper SPE 10260 presented at the 1981 Annual Technical Conference, San Antonio, Tex., October 5-7; Bouwmeester, Ron, C. M. U.S. Patent Application No. 2005/0197257; Tackett, Jr., U.S. Pat. No. 5,082,056; Crowe, Curtis, W. European Patent Application 0 278 540; and Nehmer, Warren L GB 2163790. In other exemplary embodiments, the gelling agent molecule may be depolymerized. The term "depolymerized," as used herein, generally refers to a decrease in the molecular weight of the gelling agent molecule. Depolymerized gelling agent molecules are described in U.S. Pat. No. 6,488,091, the relevant disclosure of which is incorporated herein by reference. If used, a gelling agent may be present in the acid-generating fluids of provided compositions in an amount in the range of between 0.01% to 5% by weight of the base fluid therein.

To combat possible perceived problems associated with polymeric gelling agents, some surfactants have been used as gelling agents. It is well understood that, when mixed with a fluid in a concentration above the critical micelle concentration, the molecules (or ions) of surfactants may associate to form micelles. These micelles may function, among other purposes, to stabilize emulsions, break emulsions, stabilize foam, change the wettability of a surface, solubilize certain materials, and/or reduce surface tension. When used as a gelling agent, the molecules (or ions) of the surfactants used associate to form micelles of a certain micellar structure (for example, rodlike, wormlike, vesicles, etc., which are referred to herein as "viscosifying micelles") that, under certain conditions (for example, concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (for example, shear thinning properties) due, at least in part, to the association of the surfactant molecules contained therein. Moreover, because the viscosifying micelles may be sensitive to pH and hydrocarbons, the viscosity of these viscoelastic surfactant fluids may be reduced after introduction into the subterranean formation without the need for certain types of gel breakers (for example, oxidizers). A particular surfactant that may be useful is a methyl ester sulfonate ("MES") surfactant. Suitable MES surfactants are disclosed in patent application Ser. No. 11/058,660 (U.S. Pat. No. 7,299,874), the disclosure of which is incorporated by reference. This may allow a substantial portion of the viscoelastic surfactant fluids to be produced back from the formation without the need for expensive remedial treatments. If used, these surfactants may be used in an amount of up to 10% by weight of a provided composition.

While optional, at least a portion of the gelling agent included in provided compositions may be cross linked by a reaction comprising a cross linking agent, for example, to further increase viscosity. Cross linking agents typically comprise at least one metal ion that is capable of cross linking gelling agent molecules. Various cross linking agents may be suitable; provided compositions are not limited by ligand choice on the cross linking agent. Examples of suitable cross linking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum lactate or aluminum citrate); borate compounds (such as, for example, sodium tetraborate, boric acid, disodium octaborate tetrahydrate, sodium diborate, ulexite, and colemanite); antimony compounds; chromium compounds; iron compounds; copper compounds; zinc compounds; or a combination thereof. An example of a suitable commercially available zirconium-based cross-linking agent is "CL-24™" cross linker from Halliburton Energy Services, Inc., Duncan, Okla. An example of a suitable commercially available titanium-based cross linking agent is "CL-39™" cross linker from Halliburton Energy Services, Inc., Duncan Okla. An example of a suitable borate-based cross linking agent is commercially available as "CL-22™" delayed borate cross linker from Halliburton Energy Services, Inc., Duncan, Okla. Divalent ions also may be used; for example, calcium chloride and magnesium oxide. An example of a suitable divalent ion cross linking agent is commercially available as "CL-30™" from Halliburton Energy Services, Inc., Duncan, Okla. Another example of a suitable cross linking agent is "CL-15," from Halliburton Energy Services, Inc., Duncan Okla. Where present, the cross linking agent generally may be included in a provided composition in an amount sufficient, among other things, to provide the desired degree of cross linking. In some embodiments, the cross linking agent may be present in a provided composition in an amount in the range of from 0.01% to 5% by weight of a provided composition. Buffering compounds may be used if desired, for example, to delay or control the cross linking reaction. These may include glycolic acid, carbonates, bicarbonates, acetates, phosphates, and any other suitable buffering agent. In some embodiments, if a gelling agent (for instance a cross linked gelling agent) is used, a suitable breaker may be advisable depending on the gelling agent and its interaction with the acid-generating compound, the generated acid, and the well bore conditions. A breaker may be advisable to ultimately reduce the viscosity a provided composition. Any breaker suitable for the subterranean formation and the gelling agent may be used. The amount of a breaker to include will depend, inter alia, on the amount of gelling agent present in a provided composition. Other considerations regarding the breaker are known to one skilled in the art.

Compositions described in this application for the controlled delivery of acid optionally comprise one or more bactericides in order to, inter alia, protect both the subterranean formation as well as the fluid from attack by bacteria. Such attacks may be problematic because they may lower the viscosity of the fluid, resulting in poorer performance, for example. Bacteria also can cause plugging by bacterial slime production, and can turn the formation sour. Any bactericides known in the art are suitable. An artisan of ordinary skill with the benefit of this disclosure will be able to identify a suitable bactericide and the proper concentration of such bactericide for a given application. Where used, such bactericides are present in an amount sufficient to destroy all bacteria that may be present. Examples of suitable bactericides include, but are not limited to, a 2,2-dibromo-3-nitrilopropionamide, commercially available under the tradename "BE-3S™" biocide from Halliburton Energy Services, Inc., of Duncan, Okla., and a 2-bromo-2-nitro-1,3-propanediol commercially available under the tradename "BE-6™" biocide from Halliburton Energy Services, Inc., of Duncan, Okla. In one embodiment, the bactericides are present in a provided composition in an amount in the range of between 0.001% to 0.003% by weight of a provided composition. Another example of a suitable bactericide is a solution of sodium hypochlorite, commercially available under the tradename "CA T-1™" chemical from Halliburton Energy Services, Inc., of Duncan, Okla. In certain embodiments, such bactericides may be present in a composition in an amount in the range of between 0.01% to 0.1% by volume.

Compositions described in this application for the controlled delivery of acid optionally comprise additional additives as deemed appropriate by one of ordinary skill in the art, with the benefit of this disclosure. Examples of such additional additives include, but are not limited to, pH-adjusting agents, pH-buffers, oxidizing agents, enzymes, lost circulation materials, scale inhibitors, surfactants, clay stabilizers, corrosion inhibitors (for instance, Basocorr PP), paraffin inhibitors, asphaltene inhibitors, penetrating agents, clay control additives, iron control additives, reducers, oxygen scavengers, sulfide scavengers, emulsifiers, foamers, gases, derivatives thereof and combinations thereof, and the like.

In some embodiments, compositions described in this application for the controlled delivery of acid optionally comprise additional additives, such as a foamer. Examples of foamers include but are not limited to: surfactants (e.g., water-soluble, nonionic, anionic, cationic, or amphoteric surfactants), carbohydrates (e.g., polysaccharides, cellulosic derivatives, guar or guar derivatives, Xanthan, carrageenan, starch polymers, gums, polyacrylamides, polyacrylates, betaine-based surfactants, viscoelastic surfactants, natural or synthetic clays), polymeric surfactants (e.g., partially hydrolyzed polyvinyl acetate, partially hydrolyzed modified polyvinyl acetate, block or copolymers of polyethane, polypropane, polybutane or polypentane, proteins, and partially hydrolyzed polyvinyl acetate, polyacrylate and derivatives of polyacrylates, polyvinyl pyrrolidone and derivatives, $N_2$, CO, $CO_2$, air, and natural gas. Additional examples of foamers can be found in U.S. Patent Application No. 2015/0080271, the contents of which are hereby incorporated by reference.

Methods for the Controlled Delivery of Acid

In some embodiments, the present application describes methods for controlling an acid treatment of a subterranean formation that contains a hydrocarbon reservoir, the method comprising contacting the formation with an aqueous fluid that comprises (a) a strong acid; and (b) a second acid or acid-generating compound, where the rate of reaction of the aqueous fluid with the formation is less than the rate of reaction of an aqueous fluid with the formation absent the second acid or acid-generating compound. In some such embodiments, the rate of reaction of acid with the subterranean formation is retarded such that the acid is able to more deeply penetrate the formation. In some such embodiments, the step of contacting comprises introducing the aqueous fluid into the formation via a coiled tubing or bull heading in production tubing, casing, or in drilling pipes. In some embodiments, the aqueous fluid further comprises (c), a foamer.

In some embodiments, the present application describes methods for removing scale, for instance calcium carbonate scale, comprising contacting the scale with an aqueous fluid that comprises (a) a strong acid; and (b) a second acid or acid-generating compound, where the rate of reaction of the aqueous fluid with the formation is less than the rate of reaction of an aqueous fluid with the formation absent the second acid or acid-generating compound.

In some embodiments, the present application describes methods for breaking a filter cake, comprising contacting the filter cake with an aqueous fluid that comprises (a) a strong acid; and (b) a second acid or acid-generating compound, where the rate of reaction of the aqueous fluid with the formation is less than the rate of reaction of an aqueous fluid with the formation absent the second acid or acid-generating compound. In some embodiments, a filter cake is a mud filter cake, a polymer filter cake, or a fracture fluid filter cake. In some embodiments, the present application describes methods for breaking fluid loss pills.

EXAMPLES

In order that the application may be more fully understood, the following examples are set forth. It should be understood that these examples are for illustrative purposes only and are not to be construed as limiting in any manner.

As proof-of-concept, two types of experiments were conducted: (1) static carbonate dissolution tests at room temperature and (2) linear coreflood tests at high temperature and pressure.

Unless otherwise noted, MSA:HCl and GLDA:HCl acid mixtures were created using the following stock solutions:
70 wt % MSA and 32 wt % HCl; and 40-50 wt % GLDA (manufacturer specification is 40-50 wt % GLDA) and 28 wt % HCl.

Example 1. Dissolution Experiments

The objective of this systematic series of tests was to evaluate the reactivity of different organic acids in the presence of strong mineral acid (that is, HCl) and to confirm the retardation behavior of the tested system. In a typical experiment, the following steps were performed:
- Homogenous Indiana limestone (or Dolomite) core samples having a permeability between 4-8 mD were cut, that is, 1.5" D×0.5" L. One core sample was used for each individual test.
- Cores were dried in the oven at 248° F. overnight.
- Each of the dried cores were then saturated in DI-$H_2O$ under vacuum for 12-24 h.
- The dry and saturated weight for the pre-treated cores were recorded and porosity was calculated.
- Acid mixtures were prepared (refer to Tables 1-3).
- Cores were submerged in each acid system, in the presence of an anti-foaming agent, for a period of 5 minutes at room temperature. Each reaction was video recorded and digital photos were taken of the cores before and after acidizing.
- The weight of the acidized core sample was measured for both the dry and saturated sample.
- The percent of the weight loss for each core was compared. Importantly, less weight loss is indicative of a highly retarded acid.

TABLE 1

Calculated weight loss of Indiana limestone (Calcite) core samples, post-acidizing for the acid mixtures containing MSA:HCl (250 mL total volume).

| Exp. No. | Acid Mixture* | Weight loss, % |
|---|---|---|
| 1 | 13 wt % HCl | 48.0 |
| 2 | 13 Ewt % HCl and 30 wt % MSA | 42.9 |
| 3 | 13 Ewt % HCl and 44 wt % MSA | 15.5 |
| 4 | 13 Ewt % HCl and 54 wt % MSA | 5.1 |
| 5 | 18 Ewt % HCl and 44 wt % MSA | 9.6 |

*1 ml of defoamer was added to each experiment to prevent excessive foaming.

For Table 1, Exp. Nos. 1-5, acid mixtures were created by addition of the following:
- Exp. No. 1: 92.5 mL of 32 wt % HCl and 156.25 mL of $H_2O$;
- Exp. No. 2: 92.5 mL of 32 wt % HCl, 87.5 mL of 70 wt % MSA, and 68.75 mL of $H_2O$;
- Exp. No. 3: 92.5 mL of 32 wt % HCl, 125 mL of 70 wt % MSA, and 31.25 mL of $H_2O$;
- Exp. No. 4: 92.5 mL of 32 wt % HCl, 156 mL of 70 wt % MSA; and
- Exp. No. 5: 92.5 mL of 32 wt % HCl, 92.5 mL of 70 wt % MSA.

Figure 1E:
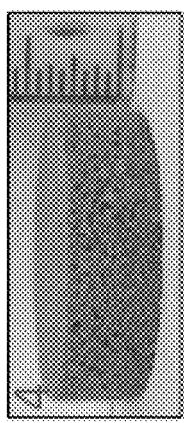
Figure 1B:
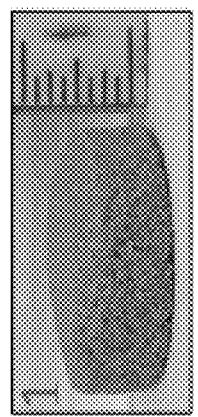
Figure 1D:
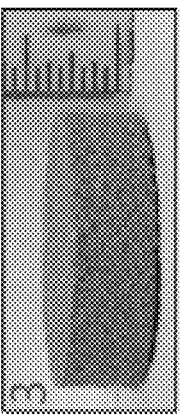
Figure 1A:
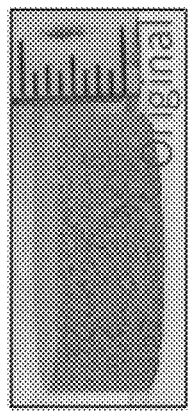

Based on the solubility results shown in Table 1 and digital photos of the acidized core samples presented in FIG. 1, it was confirmed that 54 wt % MSA reduces the available free water in the system, resulting in a delayed acid diffusion to the rock, and consequently, retarded acid reaction (FIG. 1E). This results in a minimal weight loss of 5.1% in the presence of 54 wt % MSA.

In order to evaluate the modularity of this approach, analogous studies were simultaneously conducted using another organic acid, that is, glutamic acid diacetic acid (GLDA). Indeed, formulation No. 4 containing a mixture of 15 Ewt % HCl and 50 wt % GLDA yielded a weight loss of only 7.89, which confirms the retardation effect.

TABLE 2

Calculated weight loss of Dolomite core samples after acidizing for different acid mixtures containing HCl:GLDA (100 mL total volume).

| Exp. No. | Acid Mixture* | Weight loss, % |
|---|---|---|
| 1 | 15 wt % HCl | 38.86 |
| 2 | 15 Ewt % HCl and 10 wt % GLDA | 31.06 |
| 3 | 15 Ewt % HCl and 25 wt % GLDA | 22.55 |
| 4 | 15 Ewt % HCl and 50 wt % GLDA | 7.89 |
| 5 | 20 wt % HCl | 65.05 |
| 6 | 20 Ewt % HCl and 10 wt % GLDA | 56.15 |
| 7 | 20 Ewt % HCl and 25 wt % GLDA | 40.48 |

*1 ml of defoamer was added to prevent excessive foaming.

Figures 2A, 2B, 2C, 2D:
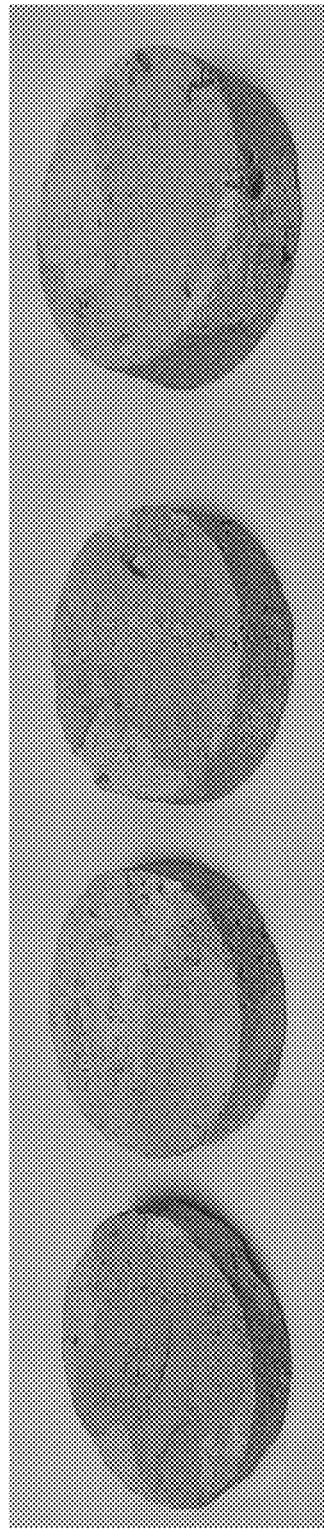
FIGS. 2A-2D. Digital photos of Dolomite core samples after dissolution tests (FIGS. 2A-2D, using acid mixtures which correspond to Table 2, Exp. No. 1-4, respectively. Specifically FIG. 2A corresponds to Exp. No. 1.

It can be observed from the data shown in Table 2 and FIG. 2 that core solubility varies based on the initial HCl concentration, however, there is a consistent trend with regard to the acid retardation as compared to the original acid mixtures (see for instance No. 1 and No. 5). The addition of a chelating agent, in this case GLDA, restricts the ionic separation of the proton ($H^+$) from the acid to attach to the rock, therefore, retarding the acid diffusion and reducing solubility. This allows sufficient time for acid to propagate through the rock with minimal face dissolution. The ability of GLDA to constrict the acid dissociation depends on the acid strength and concentration. At low concentration of 15 Ewt % HCl, GLDA significantly restricts the tendency of ionic dissociation and results in optimum retardation of 7.89% (Exp. No. 4), while at high concentration of 20 Ewt % HCl, the presence of GLDA in the acid mixture results in a minimal retardation profile (Exp No. 6 and 7).

TABLE 3

Calculated weight loss of Indiana limestone (Calcite) core samples after acidizing for different acid mixture comprised of HCl with OilSafe AR (Heartland Energy Group, LTD.) (250 mL total volume).

| No. | Acid Mixture* | % Dissolved (by mass) |
|---|---|---|
| 1 | OilSafe AR (neat) | 4.25 |
| 2 | 50 wt % OilSafe AR | 6.40 |
| 3 | 13 Ewt % HCl and 50 wt % OilSafe AR | 10.6 |
| 4 | 13 wt % HCl | 48 |

*1 ml of defoamer was added to prevent excessive foaming.

For Table 3, Exp. No. 3, the acid mixture was created by combining a 1:1 volume ratio of 32 wt % HCl and OilSafe AR.

Figure 3B:
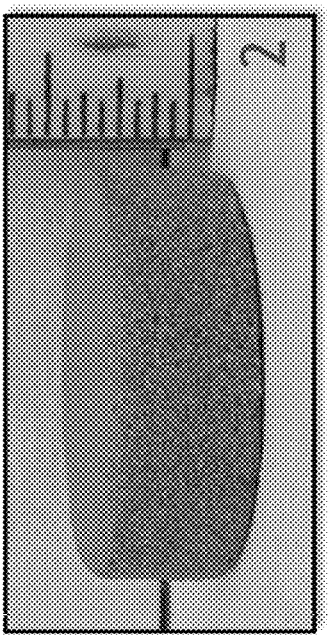
FIGS. 3A-3C. Digital photos of Indiana limestone (Calcite) core samples after dissolution tests (FIGS. 3A-3C, using acid mixtures which correspond to Table 3, Exp. No. 1-3, respectively. Specifically FIG. 3A corresponds to Exp. No. 1.
Figure 3C:
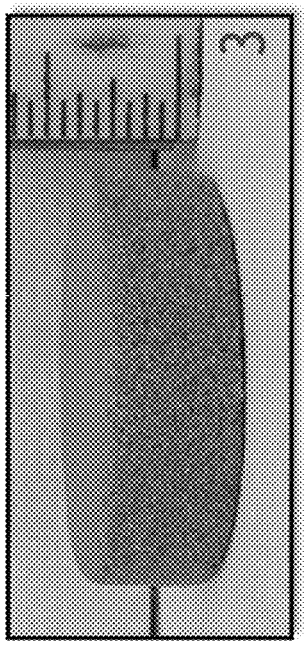
Figure 3A:
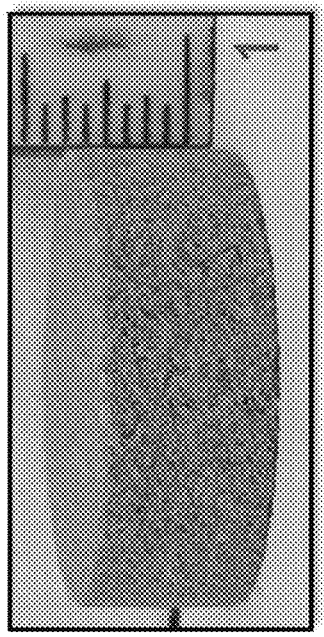

Based on the solubility results shown in Table 3 and core pic after experiments in FIG. 3, it can be confirmed that the addition of OilSafe AR reduces free water in the system resulting in a delayed acid diffusion to the rock, and consequently, retarded acid reaction. This similarly results in a minimal weight loss of 10.6% in the presence of 50 wt % OilSafe AR.

Example 2. Coreflood Experiments

The main objective of the coreflood study was to prove the concept by comparing the performance of the MSA:HCl system to conventional acid systems used in the field, that is, 15 wt % HCl and emulsified acid systems. The primary challenges associated with using HCl (15-32 wt %) at high temperatures are the rapid acid-rock reaction which hinders deep penetration of live acid into the reservoir and high corrosion rate. Notably, the corrosion can be controlled through the addition of suitable corrosion inhibitor packages but the drawback is they are often costly and toxic. A slower acid-rock reaction rate is preferred in order to minimize face dissolution and thus promote deeper invasion of the live acid into the reservoir and thus improve the permeability and the overall productivity of the well. It is known that, under analogous testing conditions, a slower reacting acid will require less volume to propagate through the core sample and achieve breakthrough.

The success of this new acid system is highlighted in Table 4, which shows that, at an acid injection rate of 2 ml/min, 15 wt % HCl emulsified in diesel requires only 0.70 PV of fluid as compared to 1.12 PV for the traditional acid package. While, the reaction does proceed at a slower rate compared to using only 15 wt % HCl, the downside is the viscosity of the fluid which results in high friction loss pressures. A new pre-engineered fluid consisting of a mixture of MSA:HCl addresses both of these requirements when the available free water in the system is controlled. Indeed, and under the same experimental conditions, the coreflood data revealed that only 0.4 PV of the new acid system was required to achieve breakthrough, thereby confirming the success of this low-viscosity new acid system for retarding the reaction. When the acid injection rate increased to 5 ml/min, the acid volume to breakthrough decreased from 0.91 PV for the regular 15 wt % HCl acid package to only 0.28 when using the low-viscosity new acid system.

Proof-of-concept was confirmed by performing a coreflood study where a MSA:HCl mixture was injected into a 12 inch Indiana limestone core sample (refer to Table 4). The pore pressure was controlled with average pore and confirming pressure of 3000 psi and 4000 psi, respectively.

TABLE 4

Summary of coreflood data for 12 inch Indiana limestone (Calcite) core samples treated with different acid systems and blends at 300° F. and 3000 psi.

| Acid System | Flow Rate (ml/min) | $PV_{BT}$ |
|---|---|---|
| 42 wt % MSA and 18 Ewt % HCl | 2 | 0.40 |
| 15 wt % HCl | 2 | 1.12 |
| Emulsified acid (15 wt %) | 2 | 0.70 |
| 15 wt % HCl | 5 | 0.91 |
| 42 wt % MSA and 18 Ewt % HCl | 5 | 0.28 |

For Table 4, the 42 wt % MSA and 18 Ewt % acid system was created by combining a 1:1 volume ratio of 32 wt % HCl and 70 wt % MSA.

Figure 4:
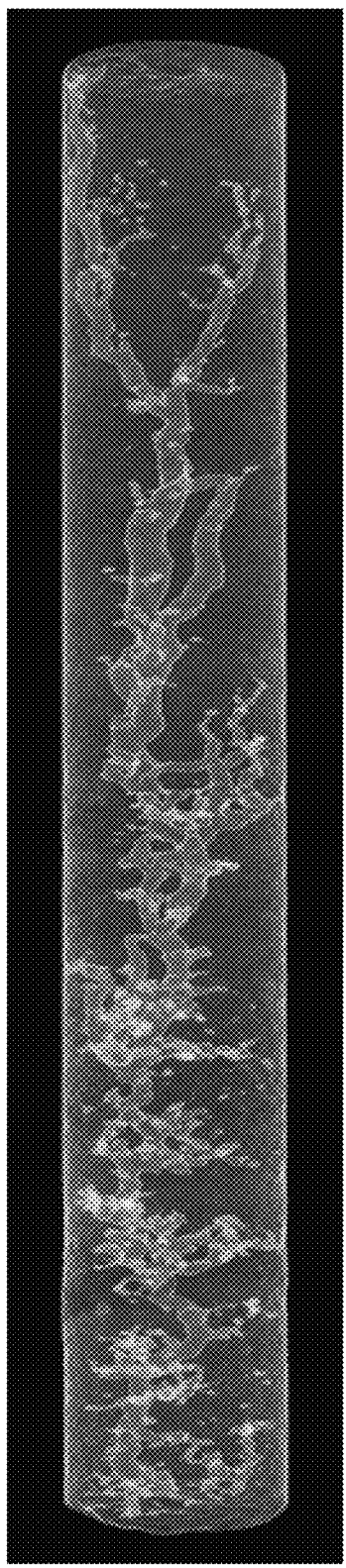
FIG. 4. Reconstructed CT scan images for acidized 12 inch Indiana limestone (Calcite) core sample treated with a blend of MSA:HCl (1:1 volume ratio between 70 wt % MSA and 32 wt % HCl) until acid breakthrough at an injection rate of 2 ml/min at 300° F. and 3000 psi.

The acidized core sample treated with MSA:HCl mixture was scanned using computed X-ray Tomography (CT) in order to characterize the wormhole propagation behavior (see FIG. 4).

Notably, the etching pattern created by this particular MSA:HCl formulation renders it particularly attractive for acid fracturing applications. An analogous laboratory experiment was therefore performed at a high flow rate (5 mL/min) to better evaluate the performance under field conditions, in which case maximum flow rates are used (for instance, 40 bbl/min). As expected with higher flow rates, the MSA:HCl acid mixture was able to achieve breakthrough after injection of only 0.28 PV of the acid mixture.

Figure 5:
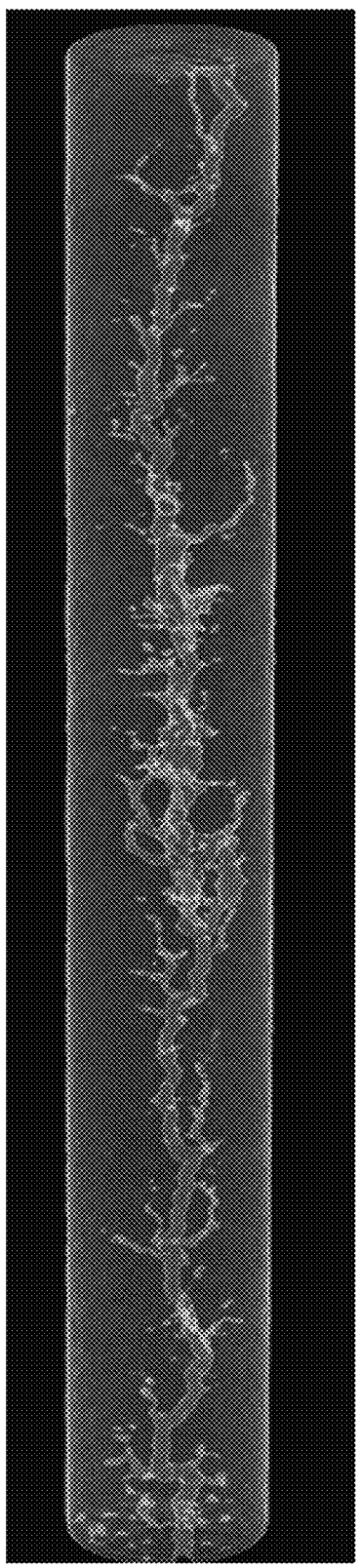
FIG. 5. Reconstructed CT scan images for acidized 12 inch Indiana limestone (Calcite) core sample treated with a blend of MSA:HCl (1:1 volume ratio between 70 wt % MSA and 32 wt % HCl) until acid breakthrough at an injection rate of 5 ml/min at 300° F. and 3000 psi.

The reconstructed CT image shown in FIG. 5, reveals a dominate wormhole pattern with less branching, as expected given that the acid has less contact time and is rapidly pushed through the core.

To evaluate the impact of organic acid type, on the $PV_{BT}$ and wormhole propagation, a coreflood experiment was carried out using a mixture of GLDA and HCl (see Table 5). The retardation effect of the HCl:GLDA acid mixture is clearly evident from this study where less $PV_{BT}$ was required as compared to using 15 wt % HCl, that is, 0.534 vs 0.91 PV. The effectiveness and modularity of the newly developed retarded acid system for acid stimulation applications was successfully demonstrated in the examples disclosed infra.

TABLE 5

Coreflood data for HCl:GLDA mixture at 300° F. using 12 inch Indiana limestone (Calcite) core samples.

| Acid System | Flow Rate (ml/min) | $PV_{BT}$ |
|---|---|---|
| 15 wt % HCl | 5 | 0.91 |
| 15 Ewt % HCl and 50 wt % GLDA | 5 | 0.534 |

Figure 6:
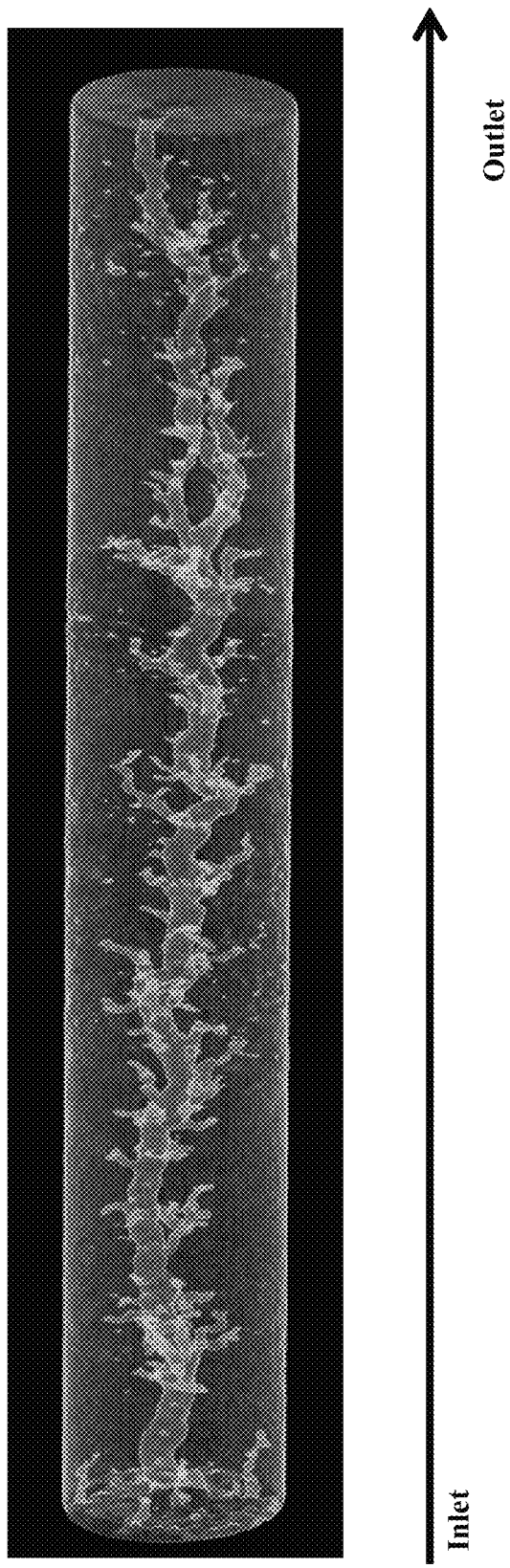
FIG. 6. Reconstructed CT scan images for acidized 12 inch Indiana limestone (Calcite) core sample treated with 15 wt % HCl until acid breakthrough at an injection rate of 5 ml/min at 300° F. and 3000 psi.
Figure 7:
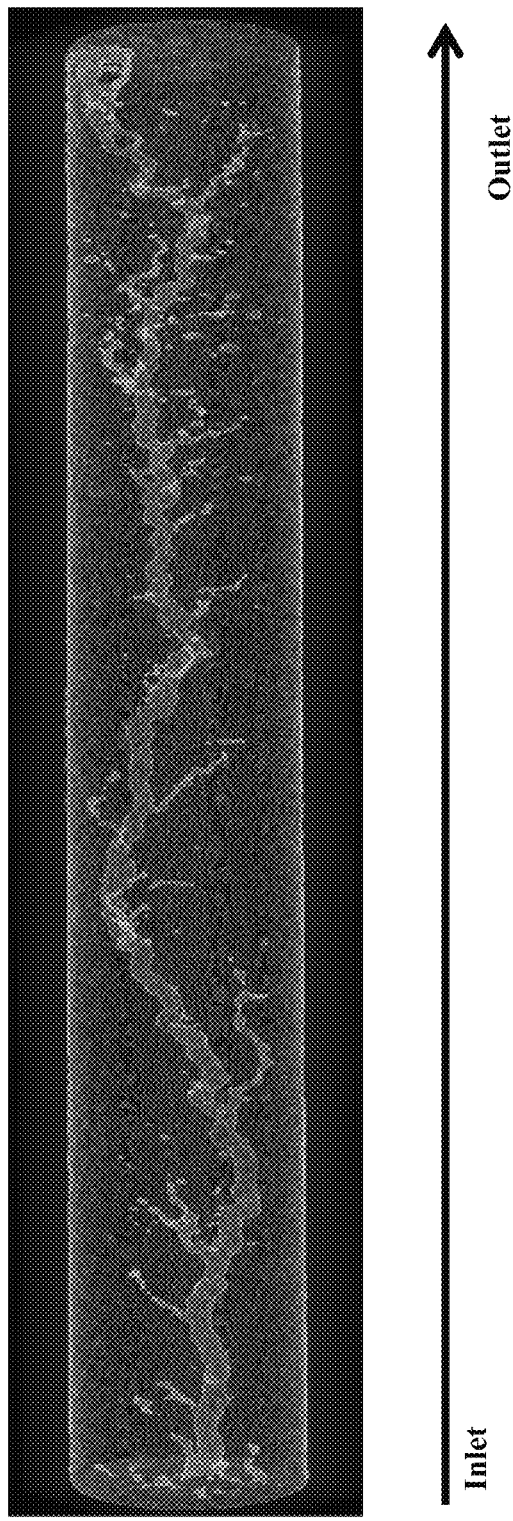
FIG. 7. Reconstructed CT scan images for acidized 12 inch Indiana limestone (Calcite) core sample treated with a blend of GLDA:HCl (1:1 volume ratio between 50 wt % GLDA and 28 wt % HCl) until acid breakthrough at an injection rate of 5 ml/min at 300° F. and 3000 psi.

FIGS. 6 and 7 demonstrate the wormhole propagation in the 12 inch core sample for the sample treated with 15 wt % HCl as compared to the acid blend containing a 50 wt % GLDA and 15 Ewt % HCl acid mixture, respectively. The effectiveness of the acidizing treatment can be noted for the chelated acid mixture by achieving a breakthrough with only $PV_{BT}$ of 0.534 and a dominant wormhole pattern.

OTHER EMBODIMENTS

Certain embodiments of the present application were described supra. It is, however, expressly noted that the application is not limited to those embodiments, but rather the intention is that additions and modifications to what was expressly described in the present disclosure are also included within the scope of the application. Moreover, it is to be understood that the features of the various embodiments described in the present disclosure were not mutually exclusive and can exist in various combinations and permutations, even if such combinations or permutations were not made express, without departing from the spirit and scope of the application. Therefore, the disclosure should not be limited to certain implementations, but rather should be limited only by the spirit and scope of the following claims.

What is claimed is:

1. A method for controlling a rate of a reaction between an acid and a rock matrix during treatment of a subterranean formation that contains a hydrocarbon reservoir, the method comprising contacting the subterranean formation with an aqueous fluid that comprises a mixture of (a) an amount of a strong acid in a range of 10 Effective Weight Percent (Ewt %) to 20 Ewt %; and (b) an amount of a second acid or acid-generating compound in a range of 40% to 60% by weight, controlling an amount of free water in the aqueous fluid with the amount of strong acid and the amount of second acid or acid-generating compound, and thereby reducing a rate of reaction of the aqueous fluid with the rock matrix relative to the rate of the reaction of the aqueous fluid with the rock matrix absent the second acid or acid-generating compound, wherein the strong acid is or comprises a mineral acid selected from hydrochloric acid (HCl), chloric acid (HClO3), hydrobromic acid (HBr), sulfuric acid (H2SO4), nitric acid (HNO3), perchloric acid (HClO4), hydroiodic acid (HI), phosphoric acid (H3PO4), or any combination thereof, the second acid or acid-generating compound is or comprises an organic acid selected from formic acid, acetic acid, methanesulfonic acid, chloroacetic acid, dichloroacetic acid, trichloroacetic acid, fluoroacetic acid, difluoroacetic acid, trifluoroacetic acid, glutamic acid, diacetic acid, or any combination thereof, and the rock matrix comprises carbonates, sandstone, shale, or any combinations thereof.

2. The method of claim 1, wherein the organic acid is selected from methanesulfonic acid or glutamic acid diacetic acid.

3. The method of claim 1, wherein the aqueous fluid further comprises a salt.

4. The method of claim 3, wherein the salt is an inorganic salt.

5. The method of claim 3, wherein the salt comprises CaCl$_2$, NaCl, KCl, CaBr$_2$, NaBr, KBr, calcium formate, or combinations thereof.

6. The method of claim 1, wherein the aqueous fluid further comprises a chelant.

7. The method of claim 6, wherein the chelant comprises phosphonic acid, 3-chloropropyl phosphonic acid, aminotris (methylene phosphonic acid) (ATMP), bis(hexamethylenetriaminepenta(methylene phosphonic acid) (BHMTPMPA), 1,2-cyclohexanediaminetetraacetic acid (CDTA), 1,4,7,10-tetraazacyclododec ane-1,4,7,10-tetraacetic acid (DOTA), 1,4,7,10-tetraazacyclodedecane-1,4,7,10-tetraphosphonic acid (DOTP), diethylenetriamineepentaacetic acid (DTPA), diethylenetriaminepenta (methylene phosphonic acid) (DTPMP), ethanol-diglycinic acid (EDG), ethylenediamineteraacetic acid (EDTA), ethylene diamine tetra (methylene phosphonic acid) (EDTMPA), ethylenedioxybis(ethyliminodi(acetic acid)) (EGTA), L-glutamic acid N,N-diacetic acid, tetra sodium salt (GLDA), hydroxyaminocarboxylic acid (HACA), 1-hydroxyethane 1,1-diphosphonic acid (HEDP), N-hydroxyethyl-ethylenediamine-triacetic acid (HEDTA), hydroxyethyleneiminodiacetate (HEIDA), N"-carboxymethyldiethylenetriamine-N,N,N', N"-tetraacetate (HDTPA), iminodiacetic acid (IDA), methylglycinediacetic acid (MGDA), N,N'-bis(carboxymethyl) glycine (NTA), nitrolotripropionic acid (NTP), nitrilotrimethylenephosphonic acid (NTMP), sodium hexametaphosphate (SHMP), tetraammonium EDTA, triethylenetetramine-N,N,N',N",N"',N"'-hexaacetic acid (and N,N'-bis(butanamide) derivative) (TTHA), terpyridine, bypyridiene, triethylenetetramine, biethylenetriamine, bis (hexamethylenetriamine) (BHMT), or derivatives or mixtures thereof.

8. The method of claim 1, wherein the amount of the strong acid in the aqueous fluid is in the range of 11 Effective Weight Percent (Ewt %) to 19 Effective Weight Percent (Ewt %).

9. The method of claim 1, wherein the organic acid is present in the aqueous fluid at a concentration in the range of 42 wt % to 54 wt %.

10. The method of claim 1, wherein the step of contacting comprises introducing the aqueous fluid into the subterranean formation via coiled tubing or bull heading in production tubing, casing, or drilling pipes.

11. The method of claim 1, wherein the aqueous fluid further comprises a surfactant.

12. The method of claim 1, wherein the aqueous fluid further comprises one or more of gelling agent.

13. The method of claim 1, wherein the strong acid is hydrochloric acid (HCl).

* * * * *